United States Patent Office 2,947,442
Patented Aug. 2, 1960

2,947,442

SANITARY CAN COATING

Gerald P. Roeser, Lahaska, Pa., assignor to American-Marietta Company, Stoner-Mudge Co. Division, Chicago, Ill., a corporation of Illinois No Drawing. Filed June 5, 1959, Ser. No. 818,258

13 Claims. (Cl. 220—64)

The present invention relates to the coating of sanitary can products with chlorinated copolymers of vinyl chloride and vinylidene chloride which are particularly and uniquely adapted for use as sanitary can coatings.

The invention is directed to a process of lining interior metal surfaces of a container for foods and beverages and the like. The invention includes the coated sanitary can products such as can bodies, ends, screw caps and also the completed cans which are produced and which have certain unique chlorinated vinyl chloride-vinylidene chloride copolymers coated thereupon.

In the United States patent to Daniel M. Gray and George L. Reymann, No. 2,675,334, dated April 13, 1954, it is disclosed that copolymers of vinyl chloride and vinylidene chloride containing between 26% and 44.5% by weight of vinylidene chloride and having a chlorine content of from 61% to 64% by weight can be dissolved in large amount in a solvent medium containing a major proportion of mononuclear aromatic hydrocarbon solvent. In this manner there is provided, after filming the composition on a metal base and baking to remove the solvent medium, a desirable sanitary can coating.

The copolymeric sanitary can coating compositions described in Patent No. 2,675,334 possess certain disadvantages. Specifically, the baked coating did not possess adequate resistance to blush when subjected to conditions of pasteurization or processing. Also, adhesion to the underlying metal base was poor, particularly after extensive fabrication of the coated metal base to form the same into a completed sanitary can product.

In the United States patent to Danieil M. Gray and George L. Reymann, No. 2,780,564, dated February 5, 1957, it is disclosed that aromatic soluble copolymers of vinyl chloride and vinylidene chloride containing from 25% to 70% by weight of vinylidene chloride in combination with a compatible oleoresinous varnish base capable of stratifying toward a metal surface enables improved adhesion to the underlying base to be achieved. The oleoresinous varnish was produced by cooking an oil-soluble, non-heat hardening varnish resin with a drying oil.

An object of the present invention is to provide vinyl chloride-vinylidene chloride copolymer coatings with improved resistance to blush under conditions of pasteurization and processing.

A further object of the invention is to provide vinyl chloride-vinylidene chloride copolymer coatings with improved adhesion to eliminate in certain instances the necessity of employing an oleoresinous varnish component.

Vinyl chloride and vinylidene chloride, when mixed and subjected to polymerizing conditions form copolymers throughout the entire range of possible mixtures. These copolymers may vary in chlorine content from approximately 57% chlorine on a weight basis with copolymers of high vinyl chloride content to approximately 73% chlorine with copolymers of high vinylidene chloride content.

It is known as indicated in the United States patent to Oliver W. Cass, No. 2,408,608, dated October 1, 1946, that chlorination of copolymers containing from 10% to 95% by weight of vinyl chloride, with the remainder of the copolymer being vinylidene chloride, increases the solubility and thermal resistance of the vinyl chloride-vinylidene chloride copolymer.

In accordance with the present invention, it has been found that a critical group of copolymers of vinyl chloride-vinylidene chloride copolymers, when chlorinated to a critical extent, are uniquely suitable for the coating of sanitary cans. It has further been found to be advantageous to bake the coatings at temperatures relatively close to the thermal decomposition temperature in order to achieve the most satisfactory sanitary can coating characteristics from the standpoint of excellent process blush resistance and adhesion to the underlying metal surface.

More particularly, it has been found that copolymers of vinyl chloride and vinylidene chloride containing between 15% and 45% by weight of vinylidene chloride, with the remainder of the copolymer being vinyl chloride, when chlorinated after copolymeriziation to numerically increase the chlorine content of the starting material on a weight basis at least 3% and not more than 8% provide superior can coatings. Thus, a copolymer of 65 parts of vinyl chloride with 35 parts of vinylidene chloride having an initial chlorine content of 62.2% is chlorinated to produce a product containing from 65.2% to 70.2% of chlorine by weight.

The copolymers which are chlorinated are substantially free of homopolymers of vinyl chloride and vinylidene chloride as well as copolymers thereof outside of the specified range of proportions and have an intrinsic viscosity within the range of about 0.15 to 0.30 as determined at 20° C. using a 0.4% solution of the resin in nitro-benzene and are soluble in mononuclear aromatic solvent.

Solutions of the chlorinated copolymers of the invention in a solvent medium comprising a major proportion of mononuclear aromatic solvent may be coated upon a metal surface such as tinplate or blackplate and baked to remove the solvent. In this way, there is provided satisfactory can coatings having improved resistance to blush.

When coatings containing the chlorinated copolymer are baked at temperatures above the thermal decomposition temperature of the unchlorinated copolymer, blush resistance is still further improved and adhesion to the underlying base is also improved. Desirably, the baking temperature of the coatings containing the chlorinated copolymer is above 300° F. Preferably, the coatings containing the chlorinated copolymer are baked at temperatures which are less than 20° F., and more preferably about 10° F. below the burning temperature of the chlorinated copolymer in order to produce the best resistance to blush and adhesion to the underlying base but without causing substantial degradation of the coating.

As a further advantage of the invention, the chlorinated copolymers of the invention possess lower viscosity in mononuclear aromatic solvents. These lower viscosities enable improved filming characteristics to be obtained and also permit the use of higher resin solids solutions or solutions containing less or no active ketone or ester solvent.

Only certain copolymers comprising vinyl chloride and vinylidene chloride can be chlorinated to produce the results of the invention. Copolymers falling outside of the range of proportions specified above do not provide effective sanitary can coatings irrespective of the extent to which they have been chlorinated. It has also been found that chlorination of copolymers comprising vinyl chloride and vinylidene chloride falling within the range of proportions specified above to an extent either greater or smaller than the critical chlorination specified above, fails to provide a satisfactory can coating composition.

The viscosity of copolymer solutions in aromatic hydrocarbon solvents unexpectedly falls off within the narrow range of vinyl chloride and vinylidene chloride proportions when the total chlorination is as set forth herein. As a result, solutions in aromatic solvents can be provided having a viscosity which is desirably low to enhance commercial coating application such as by roller coating. Chlorination above about 8% by weight of added chlorine on a numerical basis frequently increases the viscosity.

In accordance with the present invention, it has been established that as the chlorine content of the copolymers of vinyl chloride and vinylidene chloride having proportions as specified hereinbefore is increased numerically on a weight basis that the normal inadequate blush characteristics of the copolymer can be improved. When the numerical increase in chlorine content is small, for example, 1% or 2%, the resistance process and pasteurization blush is unpredictable and is frequently even less satisfactory than the initial copolymer. However, as the numerical increase in chlorination becomes greater and particularly when the numerical increase is above 3%, a progressive enhancement of blush resistance is observed.

Similarly, wet adhesion is a characteristic which is unpredictable when the increase in chlorine content is of the order of 1% or 2%. Frequently, wet adhesion is decreased by such small chlorination. Again, when the chlorination is permitted to proceed above 3%, a progressive enhancement in adhesion is observed particularly where the baking temperature is above the thermal decomposition temperature of the unchlorinated starting copolymer having regard to the time during which baking is continued.

When the copolymers are chlorinated to an extent above about 8%, the flexibility of the baked films is reduced and these films tend to crack and separate from the underlying base when the coated base is deformed to fabricate the same into a sanitary can product.

Outstanding results are achieved when the vinyl chloride-vinylidene chloride copolymers are chlorinated to provide a numerical increase in chlorine content on a weight basis of from 5% to 8%. In these instances, maximum enhancement of adhesion and blush resistance is achieved before excessive chlorination produces films of reduced flexibility. The reduction in flexibility is qute rapid; a 7–8% increase in chlorine content produces films of excellent flexibility, an 8.5% increase in chlorine content may produce films of only fair flexibility and an increase of 9% in chlorine content produces films of very poor flexibility.

The chlorinated copolymers of the invention have improved thermal stability and can withstand a higher baking temperature without scorching or burning. It has been found that the best results, particularly with respect to wet adhesion following pasteurization or process testing, are achieved when the films are baked at temperatures closely approximating the thermal decomposition temperature, and this is particularly true for those copolymers which have been chlorinated to the greatest extent, for example, from 5% to 8%. The more elevated baking temperatures provide enhanced adhesion and also improve the resistance to blush. Preferably, the baking temperature is maintained within 10° to 20° F. of the burning temperature when the bake is continued for a time sufficient to produce burning. Thus, if burning will occur at 375° F. in ten minutes, the bake is performed for a period of ten minutes at a temperature of from about 355° F. to 365° F. These elevated baking temperatures can transform chlorinated copolymers which are inadequate in one or more characteristics when baked at 300° F. (the normal baking temperature for the unchlorinated copolymers) into fully satisfactory sanitary can coatings. Normally, the baking time may be from about 5 minutes to 20 minutes in duration. The preferred baking temperatures in accordance with the invention are selected by first determining the burning temperature for the baking period which it is desired to employ.

The solvents which are employed in accordance with the invention are mononuclear aromatic hydrocarbon solvents such as benzene, toluene, xylene, ethyl benzene and mixtures thereof. A small proportion of an active polar solvent may be included in the solvent medium for the purpose of increasing the proportion of chlorinated copolymer which may be dissolved or to decrease the viscosity of a solvent solution of given resin solids content. Among the active polar solvents which may be used are chlorinated hydrocarbons such as ethylene dichloride and chlorobenzenes such as monochlorobenzene and di- and poly-chlorinated benzenes. Various oxygen containing solvents may also be used as, for example, ketones, such as acetone, methyl ethyl ketone, methyl isobutyl ketone, cyclohexanone, ethyl butyl ketone, isophorone and diacetone alcohol; esters, such as ethyl acetate, n-butyl acetate, isobutyl acetate and butyl propionate; cyclic oxygen compounds, such as tetrahydrofuran, tetrahydropyran, dioxane and propylene carbonate; ether alcohols and esters thereof, such as Cellosolve and Cellosolve acetate; nitrated organic compounds, such as 2-nitropropane and nitrobenzene; amides, such as dimethyl formamide; and nitriles; such as acetonitrile.

The employment of active ketone and ester solvents such as those above referred to is not a necessary requirement for effectuating complete solution of the chlorinated copolymers of the invention which may be dissolved in substantial proportion in mononumlear aromatic hydrocarbon solvent alone. Preferably less than 15% by weight of ketone and ester solvents are present in the solvent medium.

The initial copolymer of vinyl chloride and vinylidene chloride frequently contains a few percent of high molecular weight insoluble material which is removed by filtration, such filtration being assisted by the inclusion of 1 or 2% of a lower alcohol such as ethanol, isopropanol or butanol. Removal of these high molecular weight components may be eliminated since film properties are not affected thereby or deferred until after chlorination in which event the lower alcohols are again useful to facilitate filtration.

Chlorination of the vinyl chloride-vinylidene chloride copolymers may ordinarily be carried out by suspending the copolymeric material in an appropriate organic liquid such as carbon tetrachloride. This suspension of the copolymer in the organic liquid is then heated to a temperature high enough to initiate the reaction, temperatures in the range of 60° to 80° C. being generally suitable. Gaseous chlorine is then passed into the suspension of the copolymer while the suspension is subjected to the action of actinic radiation, particularly ultraviolet radiation. The suspension being reacted is sampled periodically and the samples tested to ascertain the weight percentage of chlorine contained in the suspended copolymer particles. When the suspended copolymer particles have attained the desired predetermined total chlorine content, the reaction is stopped and the chlorinated copolymer particles, which may have become dissolved depending upon the extent of chlorination, are removed from the organic liquid medium. This is conveniently accomplished by cooling the reaction mixture to about room temperature and precipitating the chlorinated copolymer with methyl alcohol or other precipitant. The precipitated copolymer is then removed from the organic liquid medium. The precipitated copolymer may also be recovered by spray drying or by steam distillation in order to recover solvent.

Chlorination can also be effected in various media which gelatinize and swell the copolymer particles. Tetrachlorethane alone or in admixture with carbon tetrachloride is suitable for chlorination particularly for copolymers containing high proportions of vinyl chloride which do not gelatinize or swell in carbon tetrachloride alone. Chlorination may also be effected in solution in, for example, methylene chloride.

The specific manner of chlorination and separation of the chlorinated copolymer from the chlorination medium does not constitute the essence of the present invention. It will be understood that degrading conditions of chlorination and purification are not desired.

With respect to the above described chlorination in carbon tetrachloride, removal of the chlorinated product from the chlorination medium may be effected in various ways, removal of the solvent by distillation being permissible. Low temperature distillation under vacuum or by spray drying are desirable to prevent thermal decomposition which is evidenced by discoloration. A small proportion, for example, 5%–8% by weight, of carbon tetrachloride solvent may be left in the copolymer without undue detriment. Ultraviolet irradiation (desirably 2260–4054 A.) may be conveniently supplied by a Hanovia Utility Model Quartz Lamp, Cat. No. 30,600, without filter.

When removal of solvent such as carbon tetrachloride is effected by precipitation using methanol, for example, the solution may desirably be diluted with methyl ethyl ketone prior to precipitation with methanol.

*Example I*

100 parts by weight of a copolymer of vinyl chloride and vinylidene chloride (initial chlorine content 61.6% by weight) containing 70% by weight of vinyl chloride and 30% by weight of vinylidene chloride and having an intrinsic viscosity of 0.2 at 20° C. in a 0.4% solution in nitrobenzene was suspended in 1400 parts by weight of carbon tetrachloride containing 2 parts by weight of water. Chlorine gas was bubbled through the suspension which was maintained at 78° C. and stirred constantly for a period of 10 hours. The reaction mixture was irradiated with ultraviolet light (2260–4054 A.) during the reaction. Samples were removed periodically and the chlorine content ascertained. The reaction was stopped by cooling the reaction mixture to room temperature when the desired total chlorine content was reached as indicated by the sample. The product was then precipitated by the addition of methyl alcohol to the cool solution and the chlorinated product was recovered by filtration followed by air drying.

The solid product so produced was dissolved in toluene to provide solutions containing 25% by weight of resin solids. These solutions were coated upon electrolytic tinplate and also upon blackplate and the coatings so produced were cured by baking at temperatures of from 300° F. to 390° F. It was found in comparison with the initial copolymer of 61.6% chlorine content, that when the chlorine content had been increased to approximately 64.6% the chlorinated copolymer exhibited substantially improved pasteurization and process blush resistance. Adhesion to the underlying metal base was also improved. Further increase in chlorine content up to a chlorine content of 69.6% caused further improvement in blush resistance and adhesion. The improved adhesion was particularly apparent when baking temperatures of 325° F. and higher were employed. When the chlorine content was 70% and higher, the coated films were brittle and they did not adhere well to the underlying base when the coated base was fabricated into a sanitary can product such as a can body or can end.

*Example II*

Example I was repeated using a vinyl chloride-vinylidene chloride copolymer (initial chlorine content 60.8% by weight) containing 75% by weight of vinyl chloride and 25% by weight of vinylidene chloride and having an intrinsic viscosity of 0.25 at 20° C. in a 0.4% solution in nitrobenzene. Satisfactory can coating compositions having a total chlorine content of between approximately 63.8% and 68.8% were obtained. The compositions containing in excess of about 65% chlorine by weight were best cured at temperature within 10 to 20° F. of the burning temperature of the composition having regard to the time over which the baking operation is conducted. Compositions containing less than about 63.8% chlorine were unpredictable, and they were generally unsatisfactory. Compositions containing about 70% chlorine were too brittle and not satisfactory.

*Example III*

Example I was repeated using a vinyl chloride vinylidene chloride copolymer having an intrinsic viscosity of 0.3 at 20° C. in a 0.4% solution in nitrobenzene and containing 63.25% chlorine (a copolymer containing 60% vinyl chloride and 40% vinylidene chloride). Satisfactory can coating compositions having a total chlorine content of between approximately 66.2% and 71.25% were obtained. Those compositions containing in excess of about 68% chlorine by weight were best cured at temperatures within 10 to 20° F. of the burning temperature of the composition having regard to the time over which the baking operation is conducted. Compositions containing less than 66% were generally unsatisfactory and lacked adequate adhesion and blush resistance. Compositions containing over 71.25% chlorine decreased rapidly in flexibility so that at 72% chlorine content, the flexibility was very poor.

*Example IV*

Example I was repeated using a vinyl chloride-vinylidene chloride copolymer (initial chlorine content 59.25% by weight) containing 85% by weight of vinyl chloride and 15% by weight of vinylidene chloride and having an intrinsic viscosity of 0.15 at 20° C. in a 0.4% solution in nitrobenzene. Tetrachlorethane was used in place of carbon tetrachloride during the chlorination operation. Satisfactory can coating compositions having a total chlorine content of between approximately 62.2% and 67.3% were obtained. It was again desirable to cure the compositions containing a greater proportion of chlorine at more elevated temperatures close to the burning point of the chlorinated copolymer.

Pigments, dyes, waxes and other non-reactants may be added to the composition of the invention for decorative purposes and the like without otherwise materially affecting the significant characteristics of the composition.

While I have described present preferred embodiments of the invention and methods of practicing the same, it will be recognized that the invention is not limited thereto but may be otherwise variously embodied and practiced within the scope of the following claims.

I claim:

1. In the process of lining an interior metal surface of a container for foods and beverages and the like by coating on said metal surface a copolymer of vinyl chloride and vinylidene chloride dissolved in a solvent medium comprising a major proportion of mononuclear aromatic hydrocarbon solvent and then baking the coating to remove said solvent medium, the improvement which comprises improving the blush resistance and other sanitary can characteristics of the baked coating which is produced by employing in the said process in place of the said copolymer of vinyl chloride and vinylidene chloride a copolymer of vinyl chloride and vinylidene chloride which has been chlorinated to numerically increase the chlorine content from 3% to 8% on a weight basis, said copolymer containing prior to chlorination from 15% to 45% by weight of vinylidene chloride with the remainder of said copolymer being vinyl chloride, said copolymer prior to chlorination possessing an intrinsic viscosity of substantially 0.15 to 0.30 determined at 20° C. in 0.4% solution in nitrobenzene.

2. A process as recited in claim 1 in which said mononuclear aromatic hydrocarbon solvent is selected from the group consisting of benzene, toluene, xylene, ethyl benzene and mixtures thereof.

3. A process as recited in claim 1 in which said solvent medium contains mononuclear aromatic hydrocarbon solvent and less than 15% by weight of a polar active solvent.

4. A process as recited in claim 1 in which said copolymer of vinyl chloride and vinylidene chloride is chlorinated by passing gaseous chlorine through a suspension of the said copolymer in organic medium containing tetrachlorethane.

5. A process as recited in claim 1 in which said coating is baked at a temperature above the thermal decomposition temperature of said copolymer prior to chlorination.

6. A process as recited in claim 5 in which said coating is baked at a temperature within 20° F. below the burning temperature of said chlorinated copolymer.

7. A process as recited in claim 1 in which said copolymer of vinyl chloride and vinylidene chloride is chlorinated to numerically increase the chlorine content from 5% to 8% on a weight basis and said coating is baked at a temperature above the thermal decomposition temperature of said copolymer prior to chlorination.

8. A process as recited in claim 6 in which said coating is baked at a temperature within 20° F. below the burning temperature of said chlorinated copolymer.

9. A process as recited in claim 1 in which said copolymer of vinyl chloride and vinylidene chloride is chlorinated by passing gaseous chlorine through a suspension of the said copolymer in carbon tetrachloride at a temperature in the range of 60° to 80° C. in the presence of actinic radiation.

10. A process as recited in claim 9 in which the chlorinated copolymer is removed from the reaction medium by cooling said medium and precipitating the chlorinated copolymer by addition of methyl alcohol.

11. A metal container for foods and beverages and the like having an interior metal surface thereof coated with a baked film containing a copolymer of vinyl chloride and vinylidene chloride which has been chlorinated to numerically increase the chlorine content from 3% to 8% on a weight basis, said copolymer containing prior to chlorination from 15% to 45% by weight of vinylidene chloride with the remainder of said copolymer being vinyl chloride and being substantialy free of homopolymers of vinyl chloride and vinylidene chloride as well as copolymers thereof outside of the specified range of proportions.

12. A metal container as recited in claim 11 in which said film is baked at a temperature above the thermal decomposition temperature of said copolymer prior to chlorination.

13. A metal container as recited in claim 12 in which said film is baked at a temperature within 20° F. below the burning temperature of said chlorinated copolymer.

No references cited.

UNITED STATES PATENT OFFICE
CERTIFICATE OF CORRECTION

Patent No. 2,947,442　　　　　　　　　　　August 2, 1960

Gerald P. Roeser

It is hereby certified that error appears in the printed specification of the above numbered patent requiring correction and that the said Letters Patent should read as corrected below.

Column 1, line 45, for "Danieil" read -- Daniel --; column 3, line 21, after "resistance" insert -- to --; line 50, for "qute" read -- quite --; column 5, lines 23 and 42, for "A", each occurrence, read -- $A^o$ --; column 7, line 29, for the claim reference numeral "6" read -- 7 --.

Signed and sealed this 31st day of January 1961.

(SEAL)
Attest:

KARL H. AXLINE　　　　　　　　　　　　　　ROBERT C. WATSON
Attesting Officer　　　　　　　　　　　　　Commissioner of Patents